(12) United States Patent
Reist

(10) Patent No.: US 9,266,679 B2
(45) Date of Patent: Feb. 23, 2016

(54) CONVEYING APPARATUS AND SUPPORT DEVICE

(75) Inventor: Walter Reist, Hinwil (CH)

(73) Assignee: WRH WALTER REIST HOLDING AG, Ermatingen (CH)

( * ) Notice: Subject to any disclaimer, the term of this patent is extended or adjusted under 35 U.S.C. 154(b) by 0 days.

(21) Appl. No.: 13/379,509

(22) PCT Filed: May 7, 2010

(86) PCT No.: PCT/CH2010/000124
§ 371 (c)(1),
(2), (4) Date: Feb. 15, 2012

(87) PCT Pub. No.: WO2010/148523
PCT Pub. Date: Dec. 29, 2010

(65) Prior Publication Data
US 2012/0132501 A1    May 31, 2012

(30) Foreign Application Priority Data

Jun. 25, 2009   (CH) ...................... 0993/09

(51) Int. Cl.
*B65G 21/20* (2006.01)
*B65G 15/60* (2006.01)
*B65G 15/02* (2006.01)

(52) U.S. Cl.
CPC .............. *B65G 15/60* (2013.01); *B65G 15/02* (2013.01); *B65G 21/20* (2013.01); *B65G 21/2054* (2013.01)

(58) Field of Classification Search
CPC .... B65G 15/60; B65G 15/02; B65G 21/2054; B65G 17/38; B65G 35/04; B65G 23/14; B65G 21/20; B65G 17/24; F16C 29/04

USPC .......................................... 198/833, 842, 779
See application file for complete search history.

(56) References Cited

U.S. PATENT DOCUMENTS

| | | | | |
|---|---|---|---|---|
| 3,894,627 A | * | 7/1975 | Jabbusch | B65B 35/44 198/461.1 |
| 4,075,917 A | * | 2/1978 | Kistner et al. | 83/422 |
| 4,196,805 A | * | 4/1980 | Banno | B65G 39/02 198/827 |
| 4,293,064 A | * | 10/1981 | Robinson | B65G 13/00 198/779 |

(Continued)

FOREIGN PATENT DOCUMENTS

| | | | |
|---|---|---|---|
| DE | 2612468 | 10/1977 | |
| DE | WO/2008/092287 | * 8/2008 | B65G 17/38 |

(Continued)

OTHER PUBLICATIONS

International Search Report dated Nov. 10, 2009, 3 pages.

*Primary Examiner* — Gene Crawford
*Assistant Examiner* — Thomas Randazzo
(74) *Attorney, Agent, or Firm* — Rankin, Hill & Clark LLP

(57) ABSTRACT

A moving conveying device is provided which extends in a planar manner, such as a conveyor belt or a mat top conveyor, for conveying piece goods or bulk goods and which lies in a conveying apparatus. A rolling element including a plurality of rollers is arranged between the conveying device and a support element. The conveying device moves relative to the rolling element, wherein the rollers roll on the conveying means and on the support element, and the rollers are interconnected at a distance from each other by way of a flexible connecting element.

18 Claims, 11 Drawing Sheets

(56) References Cited

U.S. PATENT DOCUMENTS

| | | | | |
|---|---|---|---|---|
| 4,363,399 | A * | 12/1982 | Ludwig et al. | 198/833 |
| 4,503,966 | A * | 3/1985 | Papalexis et al. | 198/382 |
| 4,961,651 | A | 10/1990 | Rabe | |
| 5,060,779 | A * | 10/1991 | Landaeus | 198/321 |
| 5,242,047 | A * | 9/1993 | Bonnet | 198/842 |
| 6,454,079 | B1 * | 9/2002 | Teramoto | B65G 23/30 198/334 |
| 7,040,480 | B2 * | 5/2006 | Sedlacek | 198/457.02 |
| 7,147,097 | B2 * | 12/2006 | Lemm | B65G 47/766 198/351 |
| 7,540,368 | B2 * | 6/2009 | Weiser | 198/370.09 |
| 7,628,266 | B2 * | 12/2009 | Reist | B65G 7/04 198/779 |
| 7,785,011 | B2 | 8/2010 | Reist | |
| 7,942,257 | B2 * | 5/2011 | DePaso | B65G 17/24 198/779 |
| 8,162,132 | B2 * | 4/2012 | Muller | B65G 19/30 198/779 |
| 8,162,133 | B2 * | 4/2012 | Ruge | B65G 7/04 198/600 |
| 8,177,056 | B2 * | 5/2012 | Muller | B65G 15/28 198/834 |
| 8,272,503 | B2 * | 9/2012 | Ruge | B65G 15/60 198/779 |
| 8,342,313 | B2 * | 1/2013 | Wargo et al. | 198/419.1 |
| 8,424,667 | B2 * | 4/2013 | Gonzalez Alemany | B65G 17/08 198/321 |
| 2005/0040017 | A1 * | 2/2005 | Kinnunen et al. | 198/825 |
| 2005/0067259 | A1 | 3/2005 | Layne | |
| 2007/0267278 | A1 | 11/2007 | Reist | |
| 2007/0295582 | A1 | 12/2007 | DePaso | |
| 2008/0078158 | A1 | 4/2008 | Reist | |
| 2008/0164124 | A1 | 7/2008 | Reist et al. | |
| 2010/0072029 | A1 * | 3/2010 | Reist | B65G 17/38 198/729 |

FOREIGN PATENT DOCUMENTS

| | | | |
|---|---|---|---|
| DE | 202009002971 | | 4/2009 |
| EP | 0716034 | | 6/1996 |
| EP | 1642851 | | 4/2006 |
| FR | 2231593 | | 12/1974 |
| FR | 2309433 | * | 11/1976 ............ B65G 17/06 |
| JP | 07-8331 | | 2/1995 |
| JP | H078331 | | 2/1995 |
| JP | 2000-344205 | | 12/2000 |
| JP | 2007-070020 | | 3/2007 |
| WO | 2005/113391 | | 12/2005 |
| WO | 2008/002758 | | 1/2008 |
| WO | 2008/076732 | | 6/2008 |

* cited by examiner

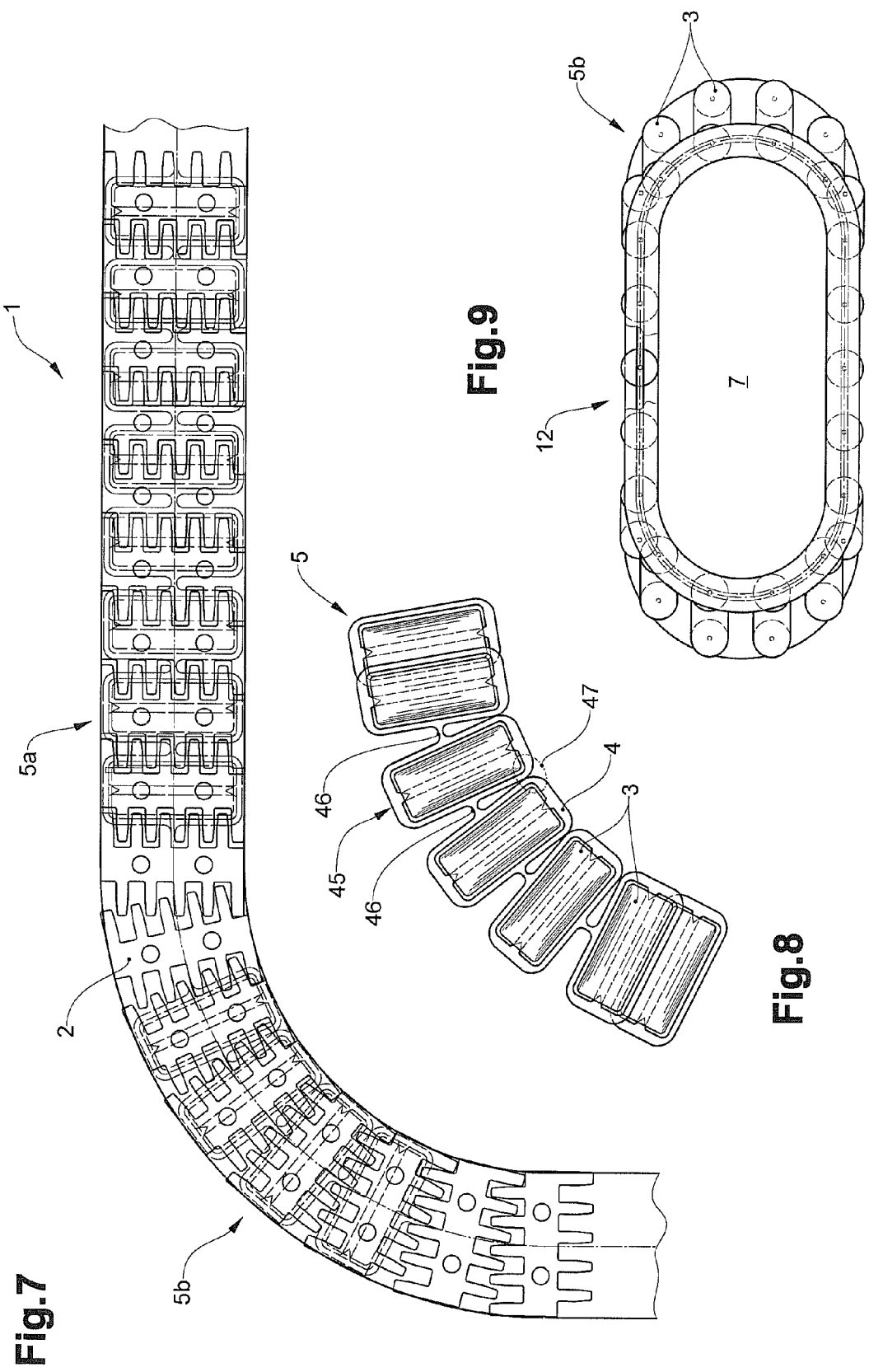

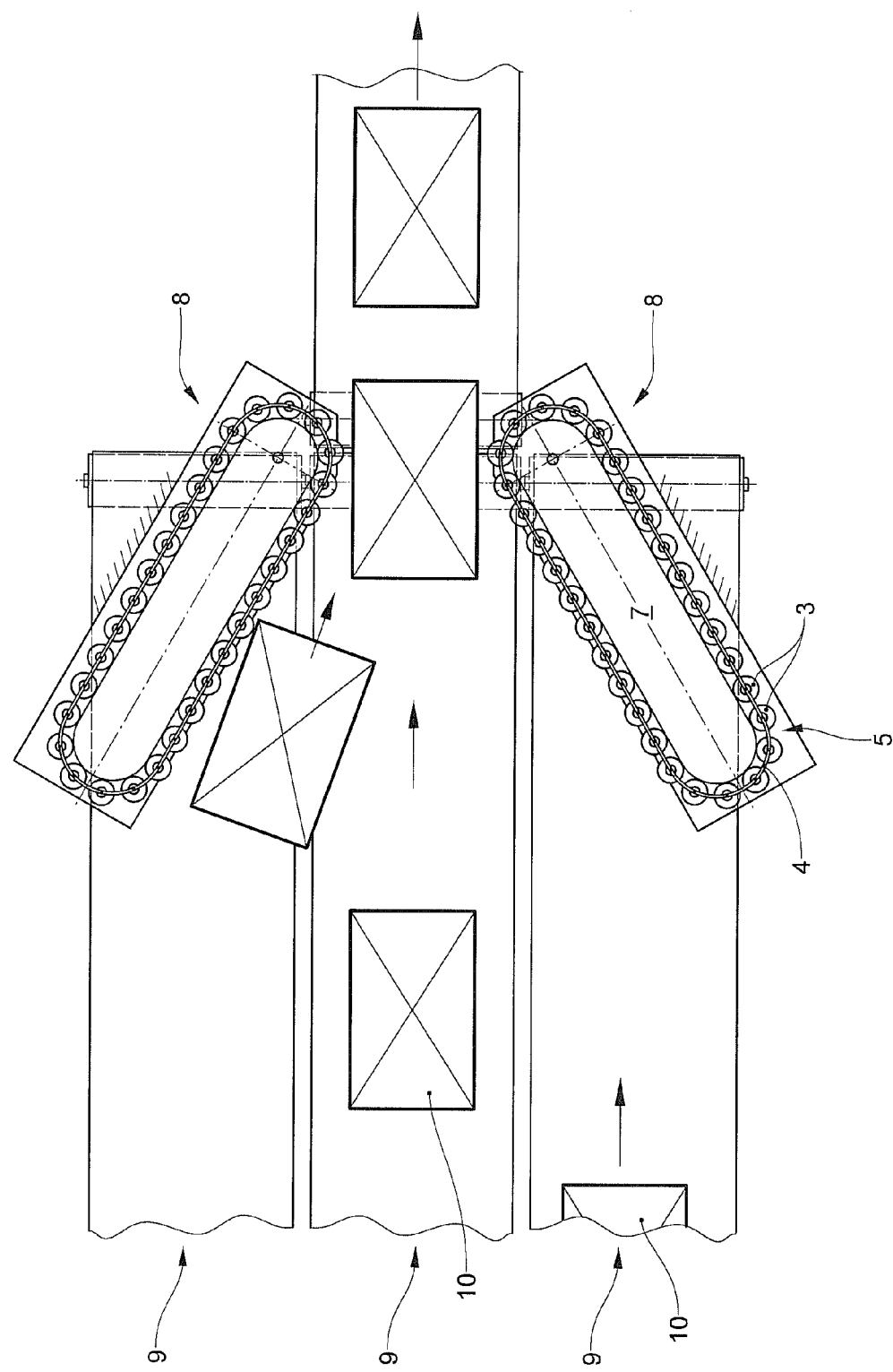

CONVEYING APPARATUS AND SUPPORT DEVICE

BACKGROUND OF THE INVENTION

1. Field of the Invention

The invention relates to the field of conveying technology. It relates to a conveying apparatus and to a supporting device for a conveying apparatus according to the preamble of the corresponding independent patent claims.

2. Description of Related Art

It is known for conveying material to be conveyed as individual entities, e.g. goods, people or animals, or as bulk material in conveying apparatuses with planar conveying means. Such conveying means either are conveying belts or have interlinked, typically rigid elements which can be displaced in relation to one another in order to be able to negotiate curves. The elements form an essentially flat surface, on which the conveying material is conveyed. These interlinked conveying means are known, for example, as mat-top chains, flat-top chains, plate-top chains (flexbelts, chain belts, carrier chains). They are referred to jointly hereinbelow as mat-top chains (flexbelts).

Depending on the type of conveying means, the ways of mounting same differ: mat-top chains are supported, for example, two-dimensionally and slide on sliding rails or sliding surfaces. Depending on the loading by the conveying material, this results in high frictional forces and corresponding motive forces for moving the mat-top chain, and also in wear. Other embodiments of mat-top chains have, as part of the mat-top chain itself, rollers which run along therewith and roll on a surface. Conveying belts, in contrast, usually roll on fixed rollers, i.e. ones which are mounted such that they can be rotated at a fixed location. The rotatable mounting of the rollers results in wear and limits the loading capability of a conveying apparatus.

FR 2 309 433, furthermore, describes a conveying apparatus for conveying individual entities. The conveying apparatus contains a chain conveyor made of movable chain links, which is driven and on which items are transported. The chain conveyor is supported by a supporting device. The supporting device comprises circulating rollers, which are connected to one another via chains arranged laterally on the rollers. The rollers are retained on the lateral chains such that they can be rotated via axial shafts.

DE 26 124 68 describes a conveying apparatus with a transporting belt which is supported by a grating arrangement. The grating arrangement comprises two parallel roller chains, which together carry cylindrical transverse bars. The roller chains contain rollers which are mounted such that they can be rotated via slide bearings and over which the grating arrangement rolls.

EP 0 978 465, in turn, describes a device for moving components linearly. The transporting device contains a transporting belt, which is fixed in a frictional manner between carriages and rolling bars. The rolling bars are mounted on rolling bodies.

All the known devices have the disadvantage that they have a complicated construction and comprise a large number of individual parts. They are therefore expensive to produce and to maintain. Many devices, in addition, have mechanical bearings with shafts, rolling-contact bearings, etc., which render the device susceptible to disruption and wear.

BRIEF SUMMARY OF THE INVENTION

It is an object of the invention to provide a conveying apparatus of the type mentioned in the introduction which has a high loading capability, in particular in the vertical direction, and nevertheless runs smoothly, that is to say with a low level of friction. It is a further object to reduce the tensile force for the drive of the conveying means. It is a further object of the invention to make it possible for such a conveying apparatus to be constructed in lightweight form, i.e. using straightforward, uncomplicated and non-specific parts made of cost-effective and lightweight materials. It is a further object of the invention to provide a supporting device which, using straightforward means, makes it possible to support moving, planar and high-load-bearing conveying means of such a conveying apparatus, and preferably also prevents sagging of elements of the conveying means in the process.

These objects are achieved by a conveying apparatus and a supporting device having the features of the corresponding independent patent claims.

The conveying apparatus according to the invention can be used for conveying bulk material or individual entities, for example material or entities which is/are at rest or which can move of their own accord, in particular people or other living things, e.g. animals. The term individual entities consequently covers both goods and living things, for example people, animals and plants. The conveying apparatus may be, for example, a conveying belt for conveying material or entities which is/are at rest or which can move of their own accord, in particular animals or people with and without baggage, as found, for example, in airports. The conveying belts may run on a level or in a slightly inclined manner. Conveying belts for conveying people over relatively long distances are also referred to as moving walkways or moving sidewalks. The conveying means may be a belt or a mat-top chain. Such moving sidewalks or walkways, in particular inclined ones, are also found, for example in supermarkets.

Furthermore, the conveying apparatus can also be used for people or animals to walk or run on. It is thus possible for the conveying apparatus to be, for example, a treadmill, which allows people or animals to undergo training, therapy and/or investigative procedures. In the case of such treadmills, the conveying means moves beneath the user, and therefore the user is encouraged to walk or run on the conveying means counter to the conveying direction. In this way, the user walks or runs without advancing in space to any significant extent. The more or less fixed-position movement of the user on the treadmill means that, on the one hand, a trainer or medical practitioner can observe the user to good effect and, on the other hand, there is no need for a complete track, which takes up a corresponding amount of space, for the purpose of carrying out the walking or running movement. The term "belt" in this context is likewise intended to cover all the embodiments of planar conveying means, such as belts or mat-top chains, mentioned in the introduction and hereinbelow.

The conveying apparatus comprises a moving, planar conveying means for conveying bulk material or individual entities, for example goods or living things, e.g. people or animals. For this purpose, the conveying means has arranged beneath it one or more supporting devices, which each have a roller body with a multiplicity of rollers. In this case, the roller body, on one side, has the rollers rolling along a non-circular path on the supporting body and, on the other side, in a supporting region, supports the conveying means by the rollers rolling on the conveying means itself or on a belt which runs along between the conveying means and rollers (the belt is regarded as being part of the roller body). The rollers are connected to one another, and spaced apart from one another, by a flexible connecting body. The supporting body expediently contains a central body, along which the roller body rolls, and in each case a side-wall body, which is fitted laterally on the central body and via which the supporting device rests on an underlying surface.

The conveying means is preferably a mat-top chain (or flat-top chain, plate-top chain, etc.) or a conveying belt. The bearing or retaining points of the rollers, via which the rollers are connected to the connecting body and guided, do not absorb any forces for supporting the conveying means and the conveying material. This means that the conveying means can be supported with very low frictional losses. The connecting body serves for conveying, and spacing apart, the rollers in the non-loaded regions of the circulatory path around the supporting body or of the path along the supporting body. Corresponding to the low friction and the roller-mounted movement of the conveying means, the wear and the motive forces for moving the conveying means are also low. Fewer drive motors and/or less powerful drive motors are required.

The rollers are preferably arranged to circulate around the supporting body, in particular to circulate in a closed circuit, also referred to as a circulatory path. Other embodiments of the invention, rather than having a closed circuit, have, for example, a rectilinear path. A supporting region, in which the conveying means rolls on the roller body, is preferably planar, that is to say non-curved, in both cases. It is possible here for the supporting region to run horizontally or also obliquely, i.e. for the purpose of conveying the conveying material upward or downward.

In preferred embodiments, a supporting region is present only at certain locations along the conveying means, expediently at locations where loading is increased, for example locations at which conveying material is accumulated. At other locations along the conveying means, conventional support, for example with slideways, may be provided.

It is, thus, possible for a flat conveying section of essentially any desired length to be supported by a roller body and supporting body of corresponding length. The roller body preferably extends essentially over the entire width of the conveying means, that is to say, for example, over more than ¾ or ⅘ of the width. This means that the conveying means is supported at most locations (as seen in cross section) and can itself be of relatively lightweight design.

A further preferred embodiment of the invention has a plurality of roller bodies which together support the conveying means. The plurality of roller bodies (apart from being coupled via the conveying means) can be moved separately from one another. They each have a dedicated supporting body or else one or more joint supporting bodies for a plurality, or all, of the roller bodies. The roller bodies are arranged one beside the other and/or one behind the other, as seen in the conveying direction, for the purpose of supporting the conveying means. The supporting devices may be arranged in direct abutment against one another and/or at a spacing apart from one another one behind the other and/or one beside the other. The supporting devices may be arranged in the same direction one beside the other in rows or offset one beside the other. Furthermore, the supporting devices may be arranged in the same direction in columns or offset one behind the other. In a preferred embodiment, the supporting devices are each offset in relation to one another in the manner of a brick wall. The supporting devices, in this way, form a planar supporting region for the conveying means. If they are arranged one beside the other in a plurality of rows, then the roller bodies in the individual rows may be offset in relation to one another, as seen in the conveying direction, and/or may be of different lengths. This makes it possible to achieve irregular distribution of transition regions between successive roller bodies (in the supporting region), and all the regions of the conveying means are thus supported uniformly.

In a preferred embodiment of the invention, the roller body has a belt, which covers, and encloses, the rollers, and therefore the conveying means rolls on the rollers via the belt. The conveying means thus rolls on the rollers as it lies on the belt. This is particularly expedient in combination with a mat-top chain: in contrast to a conveying belt, a mat-top chain has openings, which allow the chain to move, but also allow dirt to fall into the roller body. The belt counteracts this.

In a further preferred embodiment of the invention, the conveying means runs in a curve about a curve axis located essentially perpendicularly to the surface of the conveying means. The conveying means is supported in the region of the curve by at least one roller body with a connecting body, wherein the connecting body is arranged in a flexible manner around the curve axis. The conveying means, in the region of the curve, rolls on that portion of the roller body which likewise runs around the curve. A circulatory path, over which the roller body runs around the supporting body, is thus curved around the curve axis, which runs perpendicularly to the axes of the rollers. In other words, the path runs out of the level plane, which is normal to the roller axes at a certain point of the roller body. It is preferable here for a plurality of roller bodies to be present in a concentric arrangement, and the circulatory paths of the plurality of roller bodies are all curved around the curve axis.

In a further preferred embodiment of the invention, the conveying means has a trough-like cross section, with a horizontal base region and two lateral, oblique side regions adjoining the base region. The conveying means is supported on the side regions here by in each case further roller bodies according to the invention. This makes it possible to provide low-friction support for a conveying system for bulk material. For example, the conveying means is a conveying belt. The side regions are preferably angled in each case by an angle between 30° and 60° in relation to the base region.

In a further preferred embodiment of the invention, the conveying means has arranged above it at least one guide element with a roller body for the lateral guidance and deflection of conveying material. This guide element provides for low-friction deflection of the conveying material. Such a guide element can also be used for other supported conveying means, for example for conventional belt conveyors or mat-top chains, irrespective of the other aspects of the invention. The roller body of the guide element preferably has a circulating belt for safeguarding the roller body against damage or soiling.

In a further preferred embodiment of the invention, the roller bodies do not form a closed circuit. This means that the conveying means can also be designed for executing back and forth (reciprocating) movements. For example, it is possible for a flat roller body to be arranged on a flat underlying surface, which serves as a supporting body, and thus to form a moving roller carpet for a flat plate serving as the conveying means. Of course, account has to be taken here of the fact that, as the plate rolls, the roller carpet moves only by half the distance. It is, thus, necessary for the length of the roller carpet and of the conveying device to be adapted correspondingly for a certain maximum linear movement.

The roller body may be a planar composite arrangement of rollers which are retained in a planar connecting body and are arranged both one beside the other and one behind the other. The rollers may be offset or arranged in each case coaxially in rows one beside the other. It is also possible for the rollers to be offset or arranged in the same direction in columns one behind the other. Any desired combinations of arrangements of the rollers one beside the other and one behind the other are conceivable. Arranging rollers both one beside the other and one behind the other forms a kind of roller carpet, which is held together by the planar connecting body and which allows a planar conveying means to be supported over a large surface area. The connecting body may be designed in one or more pieces.

According to a particular embodiment of the invention, in the supporting device for a conveying apparatus, the rollers in the roller body or in the connecting body are arranged in a multiplicity of successive rows with a plurality of coaxially arranged rollers per row. This makes it possible for a broad conveying means to be mounted, with support, in a movable manner. This arrangement of the rollers may also be referred to as a moving roller carpet. In addition, it can also be used independently of a conveying apparatus as described hitherto, in order to allow objects to roll against one another over a large surface area.

The rollers in any row are preferably offset in the axial direction in each case in relation to the rollers of a preceding, or of a following, row. (The axial direction is equal to the geometrical axis about which the coaxial rollers are arranged for rotation). This makes it possible to provide particularly uniform support. The following row here may be an immediately following row, or it is also possible for individual rows not to be offset in relation to directly adjoining (preceding or following) rows.

The rollers in the roller body are preferably arranged in at least two columns running parallel one beside the other. Different columns here can be assigned to rows which are offset in relation to one another.

The roller body, preferably, has a flexible and planar connecting body. The normal to the surface of the planar connecting body is expediently perpendicular to the respective axes of rotation of the rollers. The rollers are preferably inserted in openings of the connecting body. The connecting body is preferably produced from a flexible, preferably also elastic, flat material, in particular by this material being cut out (i.e. by punching, water-jet cutting, laser cutting, etc.). It is preferably the case that no further machining steps are carried out, for example the deformation of parts of the connecting body to form bearing or retaining locations on the connecting body.

The flat material may be, or comprise, a planar textile structure, e.g. a woven fabric. The flat material may also be, or comprise, a composite made of planar textile structures, thin plates or panels and/or sheets. The planar structure is preferably a plastics-material/woven-fabric composite. The flat material is, for example, a plastics-impregnated woven fabric with one or more layers, or a thin plate, panel or sheet made of plastics material. It is also possible for the connecting body to be formed in a batch process or a continuous process, with the openings already provided.

The aforementioned retaining locations on the connecting body, together with the corresponding receiving locations on the rollers, form a functional unit with a bearing-like function. Material protrusions on the connecting body here engage in hollow-like depressions or notches in the ends of the rollers, wherein the depressions are expediently centered axially. Such a retaining means, as far as the functioning is concerned, is similar to a conical or jewel bearing, wherein the material protrusions on the connecting body would correspond to the bearing pins and the depressions in the end of the rollers would correspond to the bearing surfaces.

According to a particular embodiment of the invention, protuberances, which serve as locations for bearing or guiding and retaining the rollers, are cut out of, or formed from, the flat material of the connecting body and, consequently, are of the same thickness as the remaining regions of the connecting body. This means that, for example, round apertures in the rollers are mounting or retained on non-round protuberances. This gives rise to a plurality of more or less punctiform contact locations between the rollers and connecting body, and thus to a preferably loose, low-friction bearing or retaining action. The protuberances and apertures form elements which are arranged axially, that is to say parallel to the axis of the rollers, and are intended for mounting the rollers or retaining the same in a rotatable manner. The rollers run loosely, that is to say with play and without being clamped in place, in this mounting or retaining means.

The rollers are mounted or retained preferably only in the connecting body. That is to say, the mounting or retaining means serves for guiding the rollers when the latter roll on the supporting body. The mounting or retaining means, however, does not serve for the fixed-location rotatable mounting of the rollers, because the rollers, in the supporting region, rest on the supporting body and thus cannot be rotated freely at all. Accordingly, it is also the case that the bearing forces are negligibly small. It is, thus, also the case that there are no additional bodies, e.g. shafts, bearing elements, etc., which are fastened on, or attached by injection molding to, the connecting body for mounting or retaining or guiding the rollers.

The rollers are, thus, expediently arranged in a plurality of rows in the connecting body, wherein such a row may be formed from just one roller or a plurality of rollers arranged one beside the other. In the former case, the connecting body comprises precisely one column of rollers. The connecting body is preferably of a single-piece design over a plurality of such rows. The connecting body may also be formed from a plurality of layers of single-piece materials arranged parallel to one another. These plurality of layers, for example made of thin sheet material, may be connected to one another, in particular over their surface areas (by, for example, adhesive bonding or welding) or be located loosely one upon the other. Upon production of the connecting body, some of the layers may be positioned one upon the other in an offset manner and then connected to one another. That is to say, regions of overlap, at which the individual layers are connected to one another to form a relatively long piece, are formed. Connection can take place, for example, by adhesive bonding, riveting or welding. As an alternative, it is also possible for layers to be connected, or held together, by the rollers by a bearing or retaining protrusion of two or more of the layers located one upon the other, i.e. overlapping, engaging at each roller. This makes it possible for connecting bodies of any desired length to be formed from portions of limited lengths, wherein the transition locations between the individual layers are offset in relation to one another in the longitudinal direction of the connecting body, i.e. the portions overlap and are held together, or connected to one another, in the region of overlap by the rollers. In the same way, that is to say also by the overlapping connecting of a flat material or of a plurality of portions of a flat material, it is possible to form a continuous connecting body which, together with the rollers as roller bodies, forms a circulatory path around the supporting body. In a preferred variant of the invention, two or more layers are formed by a loop being formed in a single-piece strip and by the strip being laid over on itself.

The rollers, and thus the lateral surfaces thereof, are preferably cylindrical. However, it is also possible for the lateral surface of the rollers to be slightly or moderately convex, i.e. for the rollers to be, for example, barrel-shaped. Furthermore, it may also be provided that the rollers have one or more channels or grooves forming a ring all the way around them concentrically to the axis of rotation. The grooves may be guide grooves which run in corresponding guide ribs or guide ridges on the supporting body.

Further preferred embodiments can be gathered from the dependent patent claims.

BRIEF DESCRIPTION OF THE DRAWINGS

The subject matter of the invention will be explained in more detail hereinbelow with reference to preferred exemplary embodiments, which are illustrated in the accompanying drawings, in which, schematically in each case:

FIG. 7 shows a plan view of a curved region of a conveying apparatus;

FIG. 8 shows a plan view of a roller body for a curve;

FIG. 9 shows a lateral view of a supporting body for a curve;

FIG. 17 shows a conveying apparatus with lateral guide elements;

FIG. 20b shows a cross section through a supporting device taken along line A-A according to FIG. 20a.

The designations used in the drawings, and the meaning of these designations, are summarized in list form in the list of designations. It is basically the case that the same parts are provided with same designations in the figures.

DETAIL DESCRIPTION OF THE INVENTION

Figure 1:
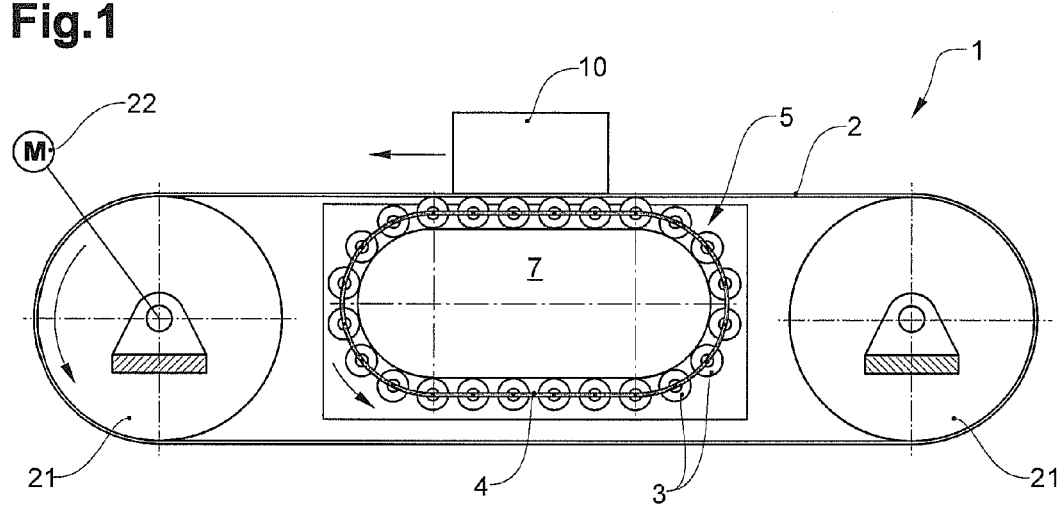
FIG. 1 shows a conveying apparatus with an integrated supporting device and a conveying belt.

FIG. 1 shows a conveying apparatus 1 with a conveying belt as a conveying means 2 for conveying material 10, in this case illustrated, by way of example, in the form of individual entities. The conveying belt is guided around deflecting rollers 21, of which, for example, one is driven by a drive 22. A supporting device 12 is arranged in a supporting region, and has a roller body 5, which circulates around a supporting body 7. The roller body 5 has circulating rollers 3, which are spaced apart from one another by means of a connecting body 4. The conveying means 2 moves in a conveying direction in relation to the supporting device 12. The rollers 3 here roll on the conveying means 2 and on the supporting body 7. The supporting device 12 thus makes it possible for the conveying means 2 to be supported with low friction and such that it can be subjected to high loading. The conveying material 10 illustrated symbolizes individual entities, bulk material or living things, such as people or animals.

In another preferred embodiment of the invention (not illustrated), the roller body 5 also circulates around the deflecting rollers 21. In order for the conveying means 2 here to be driven, it is possible for a drive to be arranged in the return strand (that is to say in the lower region of the conveying means 2) and to act there only on the conveying belt or a mat-top chain 2. The roller body 5 there runs in a region between the drive and supporting body 7. In another embodiment of the invention, the roller body 5 is in a number of parts and has a plurality of adjacent connecting bodies 4 with rollers 3. The connecting bodies 4 are spaced apart from one another by interspaces, and therefore the drive can act on the conveying means 2, through the interspaces, by means of one of the deflecting rollers 21.

It is preferably the case that the roller body 5, rather than itself being driven, is moved along only when the conveying means 2 moves. That is to say, the roller body or the rollers or the connecting body of the roller body are driven exclusively passively, rather than actively.

Figure 2:
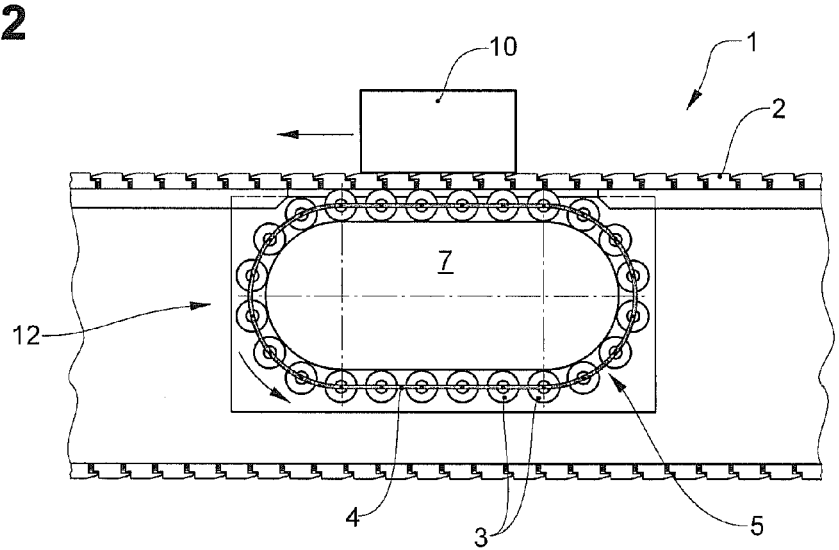
FIG. 2 shows a detail of a conveying apparatus with an integrated supporting device and a mat-top chain.
Figure 3:
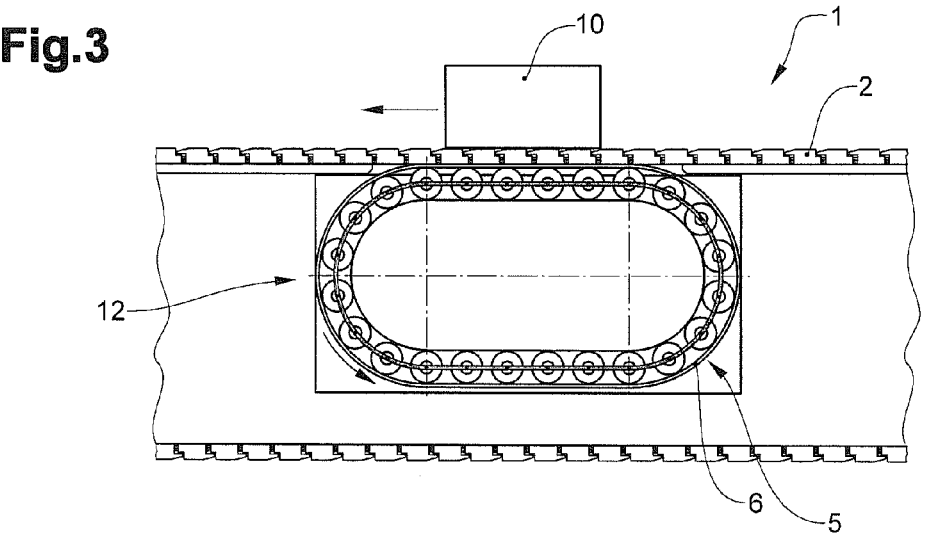
FIG. 3 shows a detail of a conveying apparatus with an integrated supporting device and a mat-top chain and a belt.

FIG. 2 shows a detail of a conveying apparatus 1 with a mat-top chain as conveying means 2. FIG. 3 shows a detail of a conveying apparatus 1 with a mat-top chain and a belt 6 in addition. The belt 6 safeguards the roller body 5 against dirt, which may fall through the mat-top chain.

Figure 4:
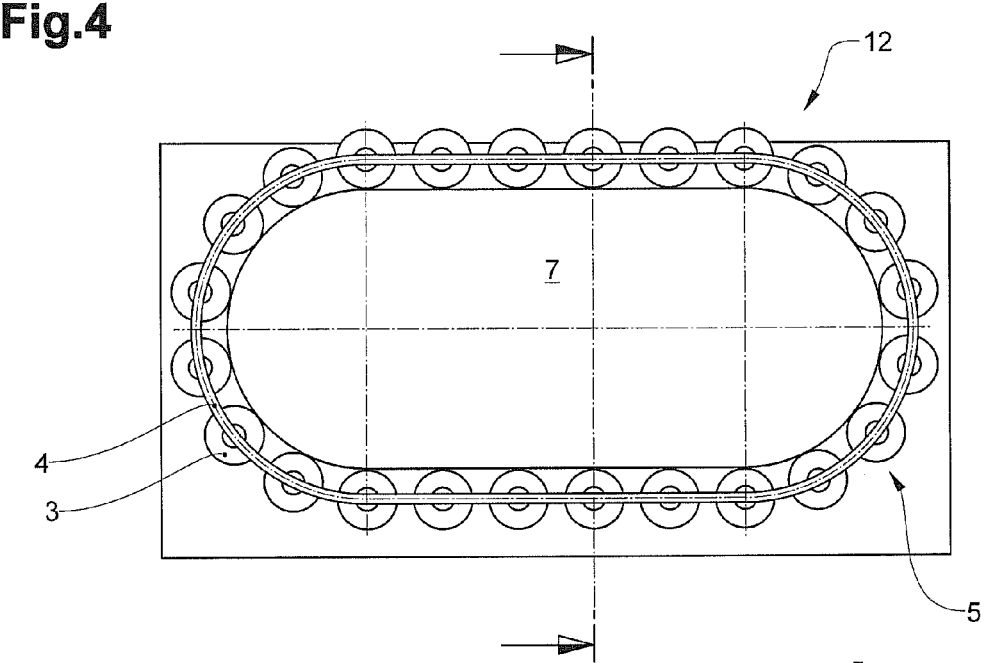
FIG. 4 shows a supporting device with a supporting body and a roller body.
Figure 5:
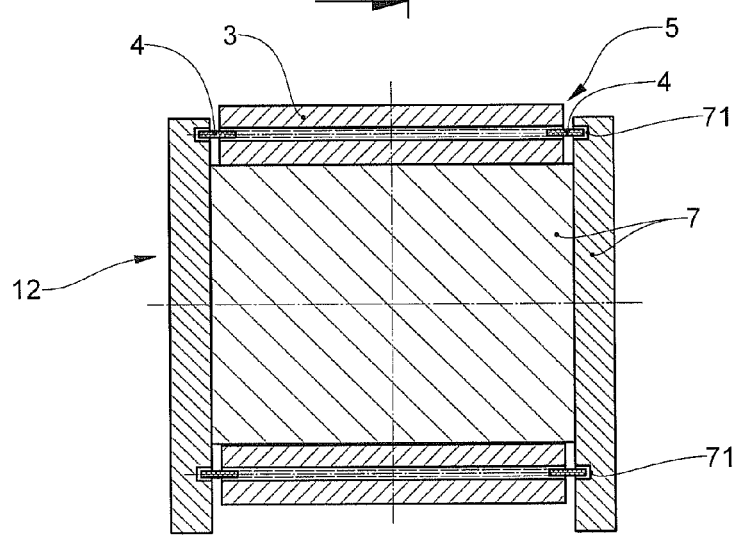
FIG. 5 shows a cross section through FIG. 4.

FIG. 4 shows a side view of a supporting body 7 with a roller body 5 and, correspondingly, FIG. 5 shows a cross section through FIG. 4. A guide groove 71 for guiding the connecting body 4 in the supporting body 7 is illustrated in addition to the elements which have already been described.

Figure 6:
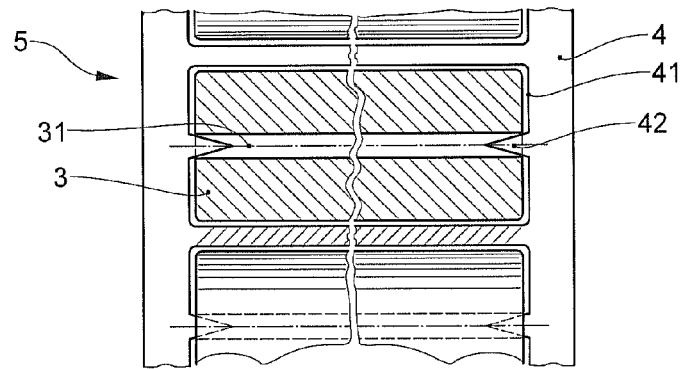
FIG. 6 shows a detail of a roller body.

FIG. 6 shows a detail of a roller body 5, with a longitudinal section through a roller 3. The connecting body 4 of the roller body 5 has openings 41, at which are formed bearing or retaining locations 42, by means of which the rollers 3 are mounted or retained and guided. The bearing or retaining locations 42 may, as illustrated, be protuberances of the connecting body 4, which engage in correspondingly shaped notches or apertures in the rollers 3. The apertures in the rollers 3 may be formed, as illustrated, as through-holes 31, that is to say that the rollers 3 are formed as sleeves or pieces of tube. As an alternative, the apertures may be formed merely as rotationally symmetrical depressions at the ends of the rollers. The depressions preferably taper inward. The rollers 3 here are preferably formed as (plastics-material) injection moldings. Conversely, it is possible for the rollers 3 to have projecting axial elements which can be inserted into openings in the connecting body 4.

FIG. 7 shows a plan view of a curved region of a conveying apparatus 1 with a mat-top chain as conveying means 2. A rectilinearly running roller body 5a and a curve-negotiating roller body 5b are illustrated by dashed lines beneath the conveying means 2. FIG. 8 shows a plan view of a roller body 5 for a curve, without the associated supporting body 7. In order to be able to negotiate the curve, the connecting body 4 has bearing or retaining regions 45, in which the rollers 3 are inserted, and connecting locations 46, which connect the bearing or retaining regions 45. In the example shown, the connecting locations 46 are arranged in the center of the connecting bodies 4, but they may also be arranged asymmetrically or all the way to one side (in the figure, where the bearing or retaining regions 45 butt against one another on account of the curve: alternative site 47 for connecting location). FIG. 9 shows a lateral view of a supporting body 7 for a curve with the roller body 5b running around the curve. It is therefore the case that, rather than running parallel to one another as in the case of a rectilinearly running roller body 5a, axes of the rollers 3 along the curve are aligned essentially with the curve axis. The center points of the rollers run along a curved surface.

Figure 10:
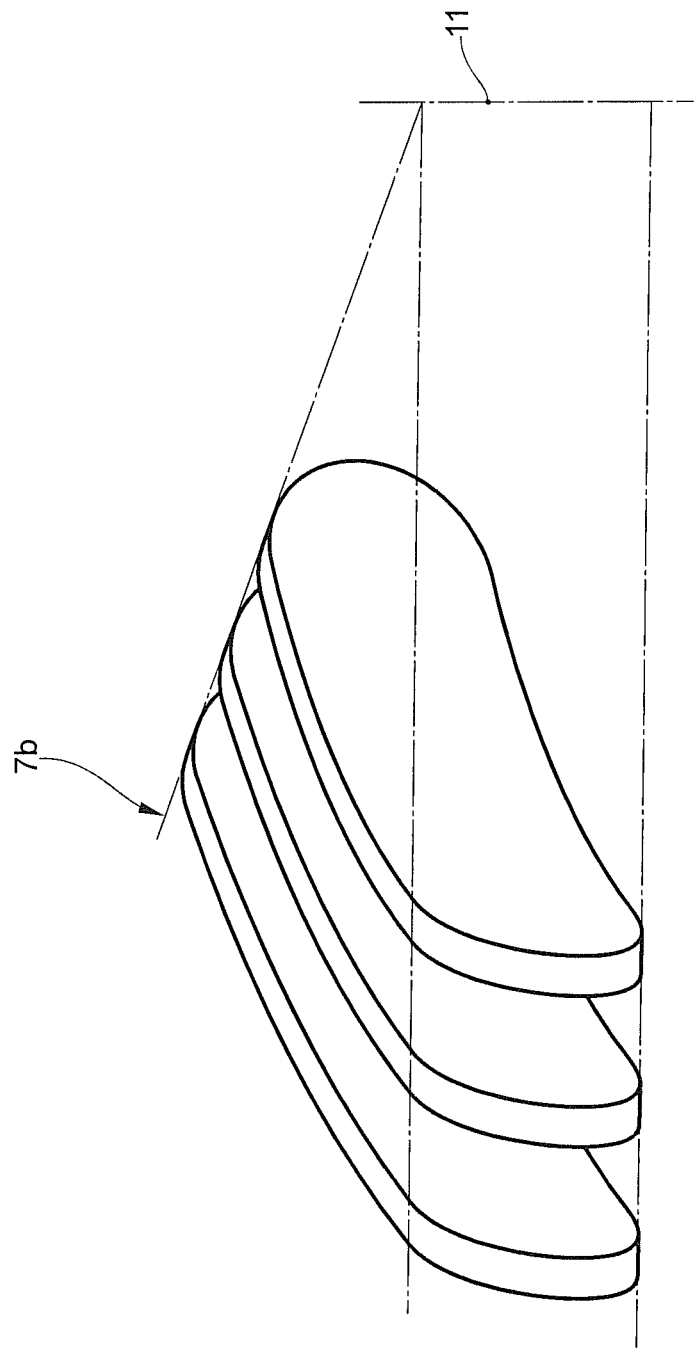
FIG. 10 shows a plurality of concentric supporting bodies for a curve.

FIG. 10 shows a plurality of concentric supporting bodies 7b for a curve, roller bodies 5 and guide grooves 71 and the like being omitted for reasons of clarity. The supporting bodies 7b form circulatory paths which are curved in relation to the curve axis 11. This makes it possible to support conveying means 2 of essentially any desired width.

Figure 11:
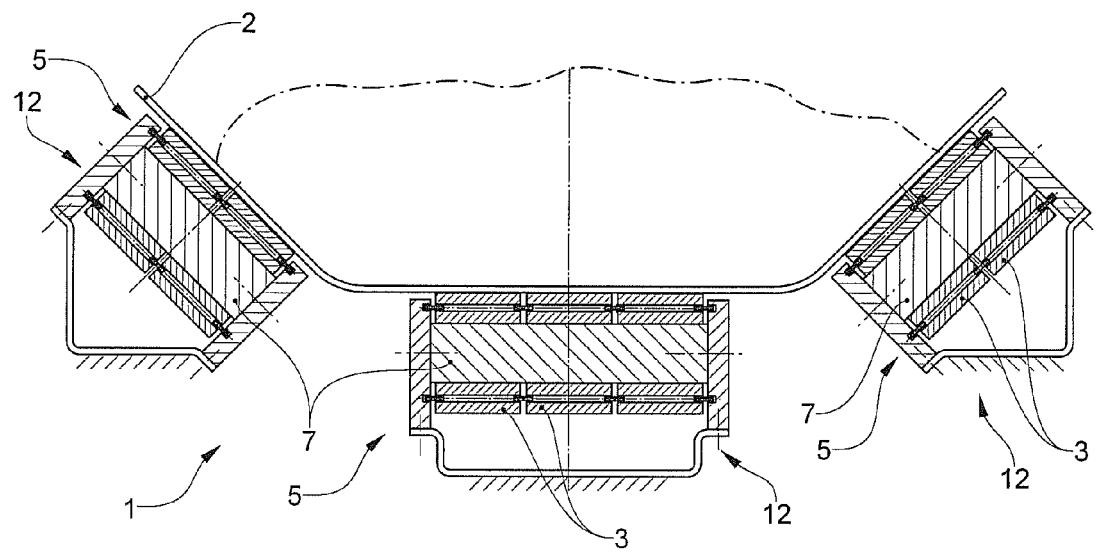
FIG. 11 shows a cross section through a conveying apparatus with laterally angled supporting regions.

FIG. 11 shows a cross section through a conveying apparatus 1 with laterally angled supporting regions, each with dedicated supporting devices 12 with supporting bodies 7 and roller bodies 5, in addition to a supporting device 12 in a horizontally depicted base region. This arrangement is particularly suitable for supporting conveying belts for bulk material.

Figure 12:
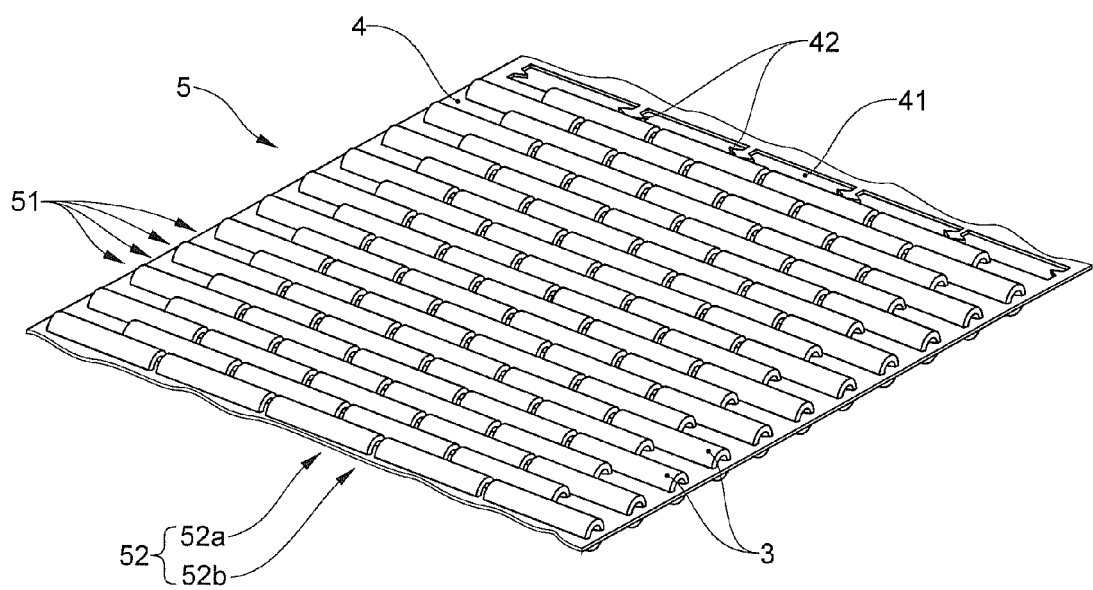
FIG. 12 shows a variant of a roller body with rows of rollers offset in the axial direction in relation to one another (detail)

FIG. 12 shows a variant of a roller body 5 with a plurality of rows 51 of rollers 3 offset in relation to one another in the axial direction (detail). The roller body 5 forms a moving roller carpet which can circulate around a supporting body 7 or can also roll on a level plane, which serves as the supporting body 7. It is also the case that a plurality of columns 52 are present in this embodiment, wherein the rollers of a first column 52a are spaced apart from one another in the movement direction and are arranged, partially in each case, between rollers of another column 52b, which is displaced laterally (that is to say in the axial direction) in relation to the first column 52a.

Figure 13:
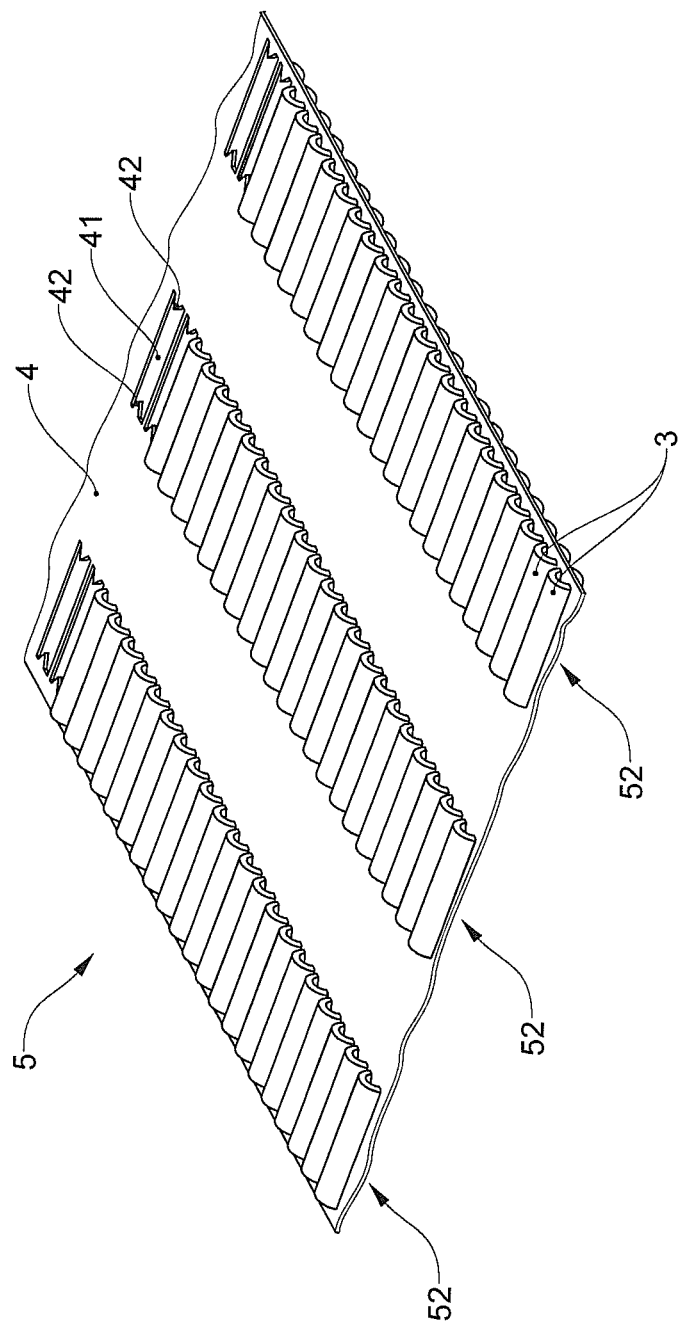
FIGS. 13 and 14 show further variants of the roller body (details)
Figure 14:
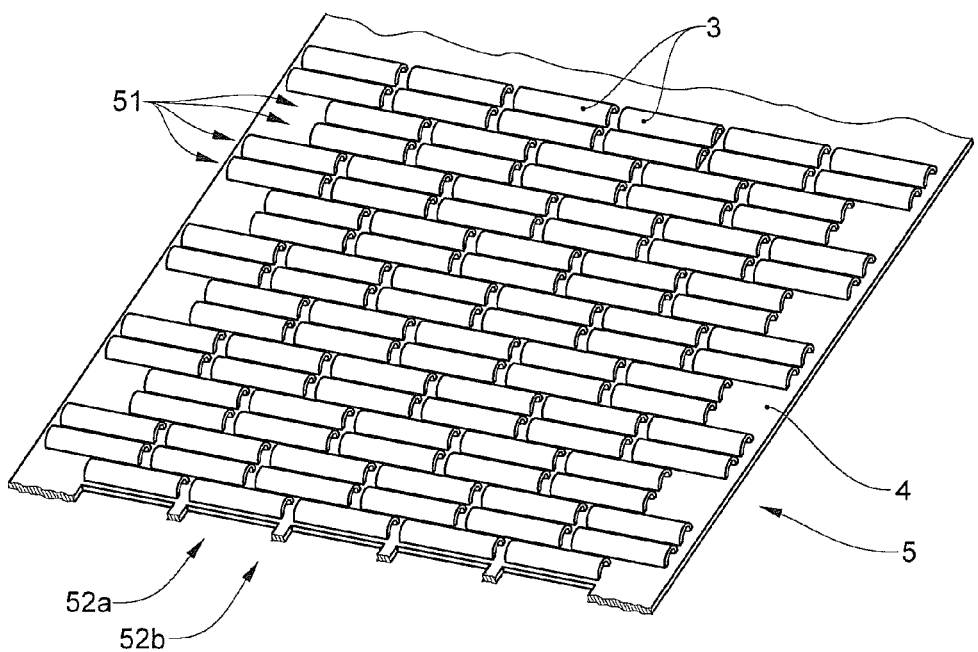

FIG. 13 shows a further variant of a roller body 5, in which the rollers 3 run in at least two, or more, columns 52 which run parallel one beside the other, and are not offset in relation to one another. For the sake of clarity, openings 41 and protuberances 42 are shown without rollers 3 inserted in rear rows of the connecting bodies 4 of FIGS. 12 and 13. FIG. 14 shows a further variant of a roller body 5, similar to FIG. 12, but with pairs of non-offset rows 51.

Figure 15:
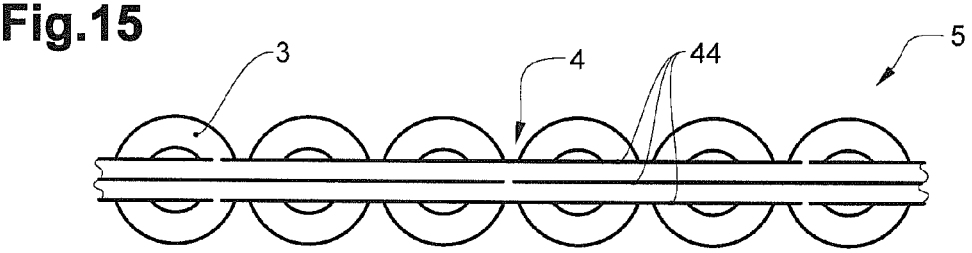
FIG. 15 shows a roller body with a connecting body made of a plurality of layers.

FIG. 15 shows a roller body 5 with a connecting body 4 made of a plurality of layers 44. The individual layers 44 are offset in relation to one another in the longitudinal direction of the connecting body. Three layers 44 are shown, but it is also possible for just two, or for four or more, layers 44 to be present. To aid clarity, the layers 44 are depicted in a separated state; in reality, they lie loosely one upon the other or are connected to one another. The depicted offset between two layers involves two rollers 3, but may also involve more.

Figure 16:
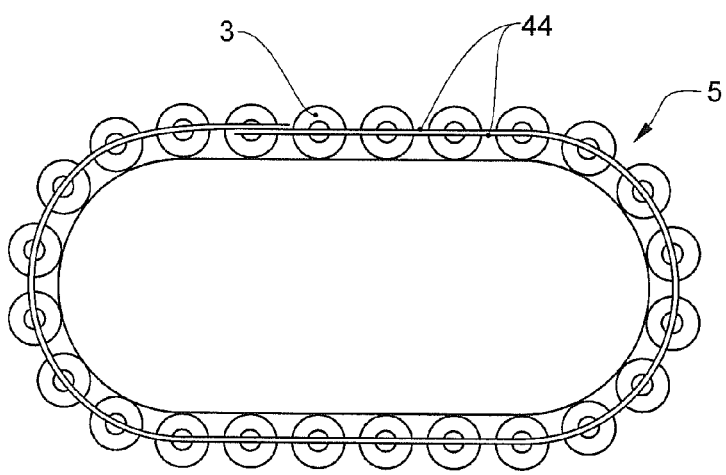
FIG. 16 shows a roller body with a connecting body made of a looped part.

FIG. 16 shows a roller body 5 with a connecting body 4 made of a looped part. This means that a single layer 44, formed in a loop, is laid over on itself and thus forms an at least two-layered connecting body 4.

FIG. 17 shows a conveying apparatus 1 with lateral guide elements 8. The guide elements 8 have roller bodies 5 and supporting bodies 7, wherein the circulatory paths of the roller bodies 5 are located in an essentially horizontal or inclined plane, in order for conveying material 10 to be guided or deflected laterally. Optional belts around all the rollers 3, as part of the roller bodies 5, have not been depicted here. In the embodiment shown, the conveying apparatus 1 serves for bringing together a plurality of conveying paths 9 arranged laterally in relation to one another, or for bringing together conveying material 10 which is transported on these conveying paths 9. A conveying path which is relatively wide overall is thus reduced to a narrower conveying path. The individual conveying paths 9 may have different conveying speeds and, for this purpose, circulate around individually rotatable rollers.

Figure 18A:
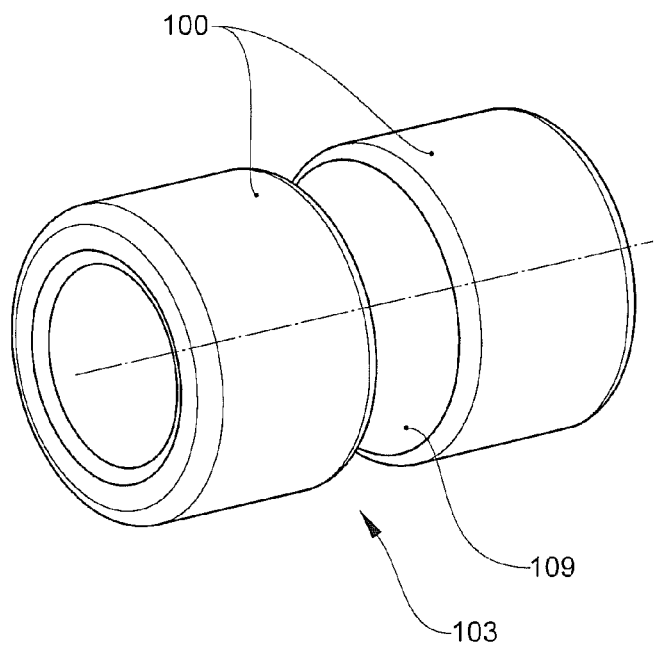
FIGS. 18a and 18b show a perspective view of particular embodiments of rollers of a roller body according to the invention.

FIG. 18a shows a further embodiment of a roller 103, which in this case is cylindrical and has a centrally arranged annular circumferential groove 109 running all the way around it. That is to say, the groove is arranged concentrically in relation to the axis of rotation of the roller. The curved (lateral) surface 100 of the roller 103, with the exception of the groove 109, is cylindrical.

Figure 18B:
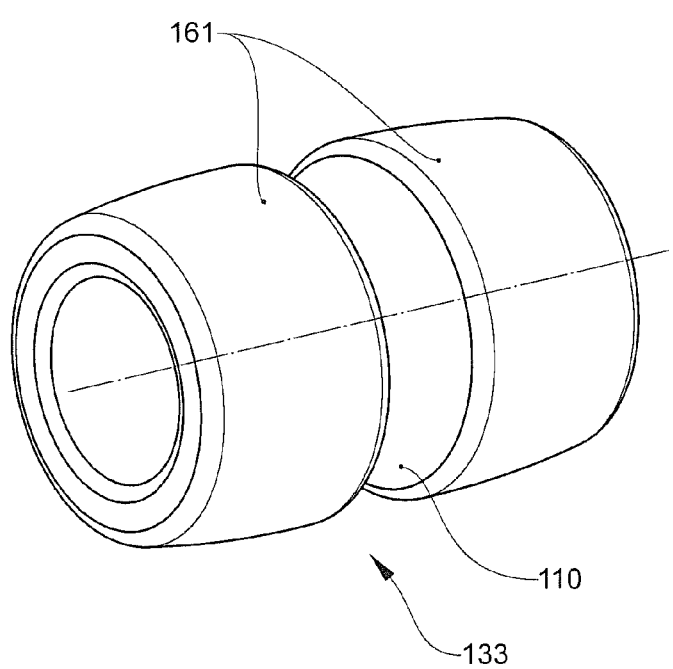

FIG. 18b shows a further embodiment of a roller 133, which differs from the embodiment according to FIG. 18a in that the lateral surface 161 is slightly convex. That is to say, the roller 133 is barrel-shaped. The concentric, annular circumferential grooves 109, 110 of the two embodiments are guide grooves, which serve for guiding the rollers 103, 133 along their circulatory path around the supporting body. The groove guidance means that transverse forces, that is to say axial forces, which otherwise act on the means for retaining the rollers on the connecting body are absorbed.

Figure 19:
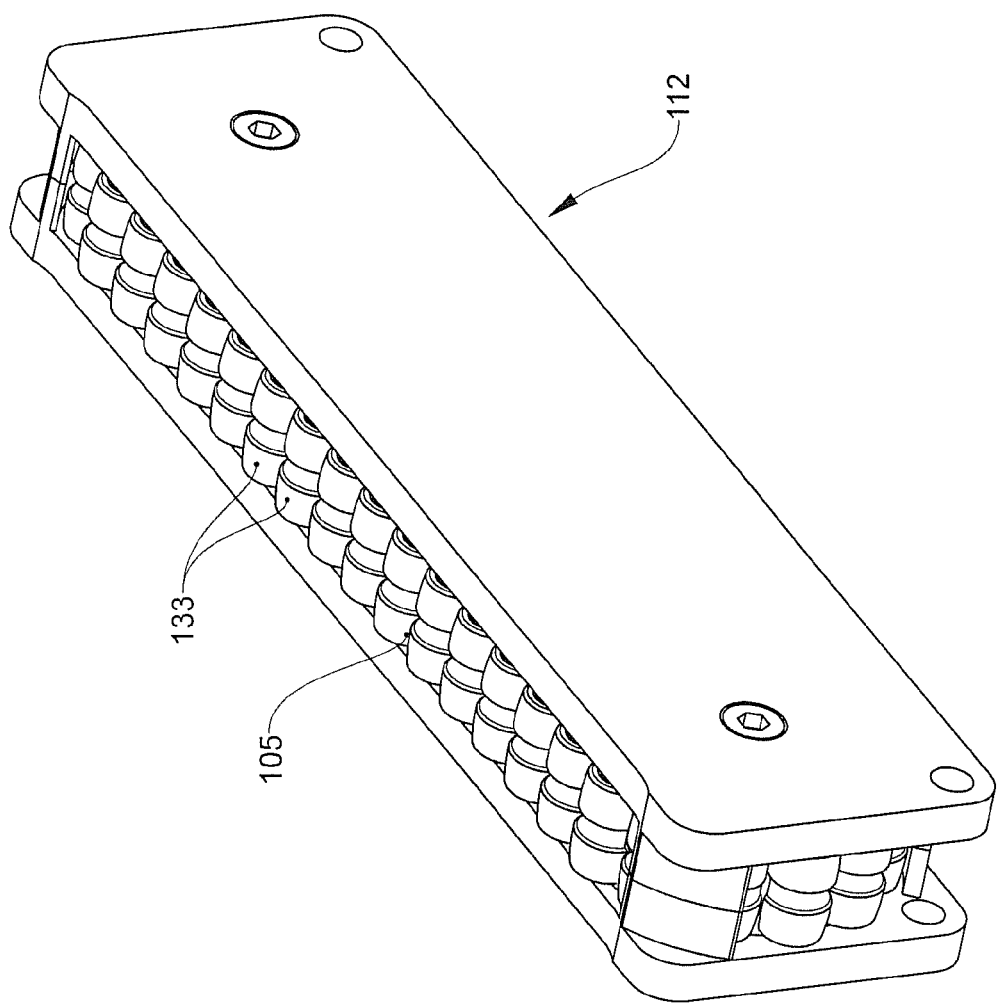
FIG. 19 shows a perspective view of a further embodiment of a supporting device with rollers according to FIG. 18b.

FIG. 19 shows a perspective view of a supporting device 112 with a roller body 105. The difference from the supporting device 12 which is shown in FIGS. 4-6 is that the roller body 105 of the supporting device 112 shown here is provided with rollers 133 according to the exemplary embodiment of FIG. 18b.

Figure 20A:
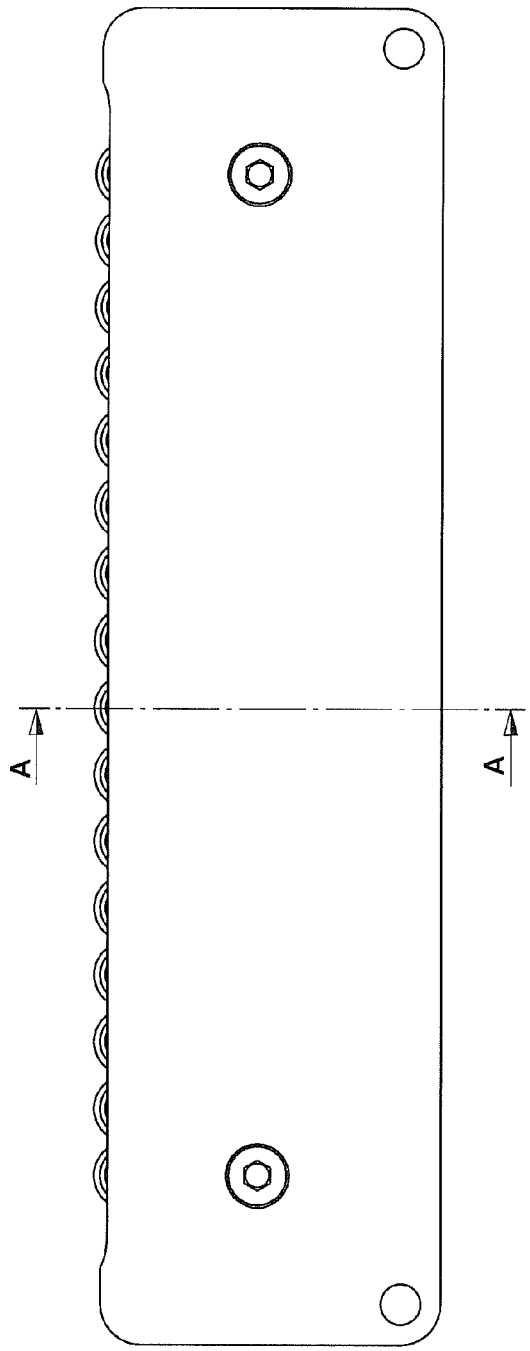
FIG. 20a shows a side view of a supporting device according to FIG. 19.

FIG. 20a shows a side view of a supporting device 112 according to FIG. 19.

Figure 20B:
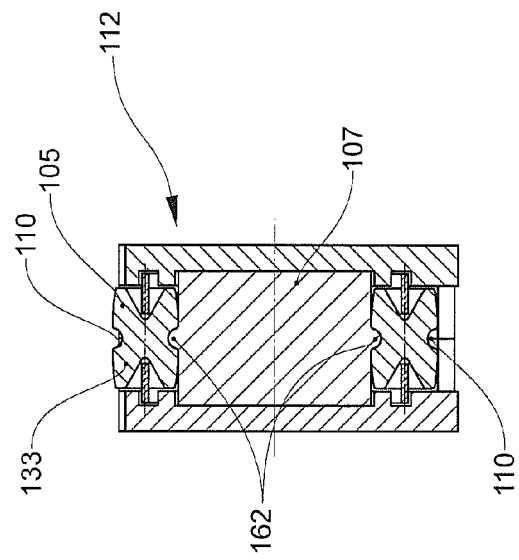

FIG. 20b shows a cross section through the supporting device 112 according to FIG. 20a, taken along line A-A. The supporting body 107 has a guide rib 162 which runs all the way around it, as seen in the movement direction of the rollers 133, and engages in the guide grooves of the rollers 133. The shape of the guide rib 162, in particular the width and height thereof, is coordinated to correspond with the cross-sectional dimensions of the groove. That is to say, the roller 133, which is guided via the guide groove 110, has only a small amount of lateral play, if any at all. The guide rib 162 may be formed with or without interruptions. The rollers 133 are retained via a planar, flexible connecting body 104 and are guided or mounted thereby on the supporting body 107. It is also possible, in principle, for the groove/rib guidance to be formed the other way round.

The additional guiding support provided by the above-described groove/rib guidance is used preferably in the case of arcuate guide paths, where the axes of successive rollers, rather than being parallel to one another as in the case of the rectilinearly running guide path, are aligned essentially with a curve axis. Such arcuate guide paths are illustrated, for example, in the exemplary embodiments according to FIGS. 7 to 10.

LIST OF DESIGNATIONS

1 Conveying apparatus
2 Conveying means
3 Roller
4 Connecting body
5 Roller body
6 Belt
7 Supporting body
8 Guide element
9 Conveying path
10 Conveying material
11 Curve axis
12 Supporting device
21 Deflecting roller 22 Drive
31 Aperture
41 Opening
42 Protuberance
44 Layer
45 Bearing or retaining region
46 Connecting location
47 Alternative site for connecting location
51 Row
52 Column
71 Guide groove
100 Lateral surface
103 Roller
104 Connecting body
105 Roller body
107 Supporting body
109 Circumferential groove
110 Circumferential groove
112 Supporting device
133 Roller
161 Lateral surface
162 Guide rib

The invention claimed is:

1. A conveying apparatus comprising:
a moving, planar conveying means for conveying bulk material or individual entities, or for people or animals to walk or run on,
a supporting device arranged beneath the conveying means, said supporting device comprising a plurality of roller bodies,
wherein each roller body of the plurality of roller bodies circulates around a supporting body in a closed circuit and each roller body comprises a multiplicity of rollers connected to one another by a flexible connecting body and spaced apart from one another by the flexible connecting body,
wherein each roller body, on one side, has the rollers rolling along a non-circular path on the supporting body and, on the other side, supports the conveying means by the rollers rolling on the conveying means itself or on belt that runs along between the conveying means and the rollers, and
wherein each one of the roller bodies can be moved separately from the other roller bodies.

2. The conveying apparatus as claimed in claim 1, wherein the conveying means is a mat-top chain or a belt, and a supporting region, in which the conveying means is supported by the roller body, is planar, and wherein the roller body extends over more than three quarters of the entire width of the conveying means.

3. The conveying apparatus as claimed in claim 1, wherein the roller bodies of the plurality of roller bodies are arranged one beside the other, as seen in the conveying direction, supporting the conveying means.

4. The conveying apparatus as claimed in claim 1, wherein the roller body comprises a belt, which runs between the rollers and conveying means and covers and encloses the rollers, and therefore the conveying means is supported by the belt.

5. The conveying apparatus as claimed in claim 1, wherein the conveying means runs in a curve about a curve axis located essentially perpendicularly to a surface of the conveying means on which surface the conveyed material is conveyed, and the conveying means is supported in the region of the curve by at least one roller body with the connecting body, which connecting body is arranged in a flexible manner around the curve axis and, in the region of the curve, the conveying means, supported by the roller body rolling on the supporting body, moves around the curve.

6. The conveying apparatus as claimed in claim 5, wherein a plurality of roller bodies are present in a concentric arrangement, and the circulatory paths of the plurality of roller bodies are curved around the curve axis.

7. The conveying apparatus as claimed in claim 1 wherein the conveying means comprises a trough-like cross section, with a horizontal base region and two lateral, oblique side regions adjoining the base region, and wherein the conveying means is supported on the side regions by, in each case, further roller bodies.

8. The conveying apparatus as claimed in claim 7, wherein the conveying means is a conveying belt, and the side regions are angled in each case by an angle between 30° and 60° in relation to the base region.

9. The conveying apparatus as claimed in claim 1, wherein the conveying means has arranged above it at least one guide element with a roller body for the lateral guidance and deflection of conveying material.

10. The conveying apparatus as claimed in claim 1, wherein the roller body, rather than itself being driven, is moved along only when the conveying means moves.

11. A supporting device for a conveying apparatus, said conveying apparatus comprising a moving, planar conveying means for conveying bulk material or individual entities, or for people or animals to walk or run on,
the supporting device being arranged beneath the conveying means and comprising a plurality of roller bodies,
wherein each roller body of the plurality of roller bodies circulates around a supporting body in a closed circuit and each roller body comprises a multiplicity of rollers connected to one another by a flexible connecting body and spaced apart from one another by the flexible connecting body,
wherein each roller body, on one side, has the rollers rolling along a non-circular path on the supporting body and, on the other side, supports the conveying means by the rollers rolling on the conveying means itself or on belt that runs along between the conveying means and the rollers, and
wherein each one of the roller bodies can be moved separately from the other roller bodies;
wherein the rollers in the roller body are arranged in a multiplicity of successive rows with just one roller per row or with a plurality of coaxially arranged rollers per row, and wherein the rollers are inserted in openings of the connecting body, and wherein the connecting body is cut out of a flexible flat material; and,
wherein the connecting body comprises a plurality of single-piece layers and each of the layers extends in the movement direction and over a plurality of rows or over all of the rows.

12. The supporting device as claimed in claim 11, wherein the rollers in any row are offset in their axial direction relative to the rollers of a preceding or a following row.

13. The supporting device as claimed in claim 11, wherein protrusions on the connecting body engage in hollow-like depressions or notches in the ends of the rollers, serving as bearings for the rollers, and are of the same thickness as the remaining regions of the connecting body.

14. The supporting device as claimed in claim 11, wherein the connecting body comprises a plurality of layers arranged parallel to one another by the layers being formed by a loop being formed in a single-piece strip and by the strip being laid over on itself.

15. A roller body for a supporting device of a conveying apparatus, said conveying apparatus comprising a moving, planar conveying means for conveying bulk material or individual entities, or for people or animals to walk or run on,
- said supporting device being arranged beneath the conveying means, said supporting device comprising a plurality of roller bodies,
- wherein each roller body of the plurality of roller bodies circulates around a supporting body in a closed circuit and each roller body comprises a multiplicity of rollers connected to one another by a flexible connecting body and spaced apart from one another by the flexible connecting body,
- wherein each roller body, on one side, has the rollers rolling along a non-circular path on the supporting body and, on the other side, supports the conveying means by the rollers rolling on the conveying means itself or on belt that runs along between the conveying means and the rollers, and
- wherein each one of the roller bodies can be moved separately from the other roller bodies;
- wherein the rollers in each roller body are arranged in a multiplicity of successive rows with just one roller per row or a plurality of coaxially arranged rollers per row, and wherein the rollers are inserted in openings of the connecting body, and wherein the connecting body is cut out of a flexible flat material;
- and wherein the connecting body comprises a plurality of single-piece layers and each of the layers extends in the movement direction and over a plurality of rows or over all of the rows.

16. The conveying apparatus as claimed in claim 1, wherein some of the roller bodies of the plurality of roller bodies are arranged one behind the other, as seen in the conveying direction, supporting the conveying means.

17. The conveying apparatus as claimed in claim 16, wherein others of the roller bodies of the plurality of roller bodies are arranged one beside the other.

18. The conveying apparatus as claimed in claim 17, wherein the roller bodies are arranged one beside the other in a plurality of rows, and the roller bodies in the individual rows are offset in relation to one another, as seen in the conveying direction.

* * * * *